June 23, 1936.   A. W. MALEY ET AL   2,045,038
POWER AND CONTROL EQUIPMENT OF ELECTRICALLY DRIVEN VEHICLES AND MACHINERY
Filed Sept. 5, 1934   3 Sheets-Sheet 1

INVENTORS
Alfred Walter Maley + Edmund M. Taunton
By Arthur J. S......
Attorney.

June 23, 1936.  A. W. MALEY ET AL  2,045,038
POWER AND CONTROL EQUIPMENT OF ELECTRICALLY DRIVEN VEHICLES AND MACHINERY
Filed Sept. 5, 1934   3 Sheets-Sheet 2

INVENTORS
Alfred Walter Maley + Edmund McTaunton
By Arthur J. Sutton
Attorney.

Patented June 23, 1936

2,045,038

UNITED STATES PATENT OFFICE 2,045,038

POWER AND CONTROL EQUIPMENT OF ELECTRICALLY DRIVEN VEHICLES AND MACHINERY

Alfred Walter Maley, Handsworth, Birmingham, and Edmund Mackenzie Taunton, Harborne, Birmingham, England Application September 5, 1934, Serial No. 742,742
In Great Britain September 7, 1933

11 Claims. (Cl. 172—179)

In the early days of electric traction, vehicles were driven by a single direct current series motor and their speed was controlled by putting resistance in the motor circuit. Later on the field windings of the motor were divided into sections, and certain changes of speed were obtained by what was then known as field commutation, that is connecting the sections in series, in series parallel, or in parallel, thereby lessening the amount of power that had to be wasted in external resistance. Then it was recognized that the use of two motors to drive a vehicle offered a valuable possibility of connecting the motors in turn in series and in parallel, so giving the effect of a change of supply voltage which otherwise had only been attainable by the use of batteries or with alternating current.

An attempt was also made to lessen further the reduced amount of external resistance required for series parallel control of two motors, by dividing the field windings into sections, and, starting with the motors in series, cutting out the external resistance and then short-circuiting these sections one by one, throwing them all into circuit again upon the armatures being placed in parallel. But the switch operations gave rise to grave difficulty, for unless the switch operated with great rapidity or the contacts acted in perfect unison serious short-circuiting would occur.

For many years, therefore, series parallel control of two motors with undivided fields by the aid of external resistance has been the almost universal method employed in driving vehicles. Of recent years the desire for higher speeds from existing equipment has led again to the use of field tappings enabling a part of the field winding to be cut out after the highest speed attainable by series parallel control has been attained. And the equal desire for greater economy of power has led to various methods of field control designed to give regeneration.

By the present invention smooth acceleration is obtained from start to top speed, with no interruption of line current at any moment, without any expenditure of power in external resistance. Two armatures or armature windings are employed (or a multiple of two) which are placed successively in series and parallel, and the field winding is divided into sections not by cutting its length into shorter lengths but by dividing its cross-section, in other words replacing the normal field winding by a number of windings of the same number of turns as the normal winding, but of a fraction of its cross-section, the sum of the cross-sections of the several sections being equal to that of a normal winding. It is convenient to divide the winding into as many sections as there are poles, or a multiple or submultiple of that number. A great majority of traction motors are four-pole motors, and for them—for the invention is particularly applicable to the modification of existing equipments to give a wide range of speeds with greater economy of power—the usual field winding is replaced by four sections each of the same number of turns as the usual winding but of one quarter of the cross-section; and to economize insulation and space one section of the winding may be placed on each pole. The vehicle starts with both armature windings and all field sections in series, and the several speeds corresponding with the several notches of the controller are obtained by first connecting the field sections in series, then in suitable series parallel arrangements, and finally in parallel, then placing the armatures in parallel with the field sections in series, then again connecting the field sections in series parallel arrangement, and finally putting them in parallel. Thus for like performance of the motors the weight of copper in the field coils is practically the same as with fields of usual type and—unless the speed range is extended by the use of field tappings—all field copper is in use all the time; the total watts dissipated in the motor armatures and field are the same or less than with fields of usual type.

It is important that the switching operations shall occur in the proper order, however quickly a driver may move the handle of his controller; and with the limited arc of travel available for power notches on the usual drum controller it is difficult to ensure this. It is preferable, therefore, to employ contactors. But shunt contactors present grave difficulties, and series contactors cannot easily be designed to operate satisfactorily on all possible values of the motor current. According to a further development of the invention the changes of field connections are effected by contactors the windings of which are in series with the several field sections. The range of current over which the contactor must be designed to act is thereby much diminished, and the proper successive action of the contactors is made certain; for if, for any reason, a contactor fails to act the speed previously reached is maintained. The contactors are 2-way and preferably 2-pole contactors, that is to say they complete one circuit when unexcited and another when excited, and they complete that circuit in each of the two motors. They are preferably double wound, with one part of the winding in series with a section of the field of one motor and the other part in series with the corresponding section of the field of the other motor, and they may be designed to operate when one winding only receives current, so that one motor may still be controlled if the other has to be cut out of circuit owing to a breakdown.

When electrically driven vehicles are equipped with rheostatic or magnetic braking or both, this may be retained in conjunction with the invention. For such electric braking the armatures are connected in parallel to reduce the voltage generated, and when the present invention is employed the field sections may be placed in parallel for braking for the same reason. This involves the operation of all the field contactors between the first power notch and the first brake notch on the drum controller, an interval that is very rapidly passed over when a driver has urgent reason for applying the brakes. To provide for this the field contactors may be operated mechanically as the controller passes between these two notches, for instance by a cam shaft rocked by electromagnetic or other mechanism. To avoid so operating all the field contactors the field sections may be left in series for braking, and a diverting resistance put in shunt with them on brake notches.

Where the invention is applied to existing cars which already have rheostats connected with the controller or controllers at the ends of the car, the usual resistance cables may be made to serve a double purpose by the use of a throw-over switch by which the wires are connected to the contactor coils and field sections on the power notches of the controller, and to the resistance on the brake notches. Such a switch may be combined with the contactor-actuating cam shaft above suggested, if one is used, and may be similarly operated.

Further features of the invention will appear from the following description of typical examples of it illustrated in the accompanying drawings.

Figure 14:
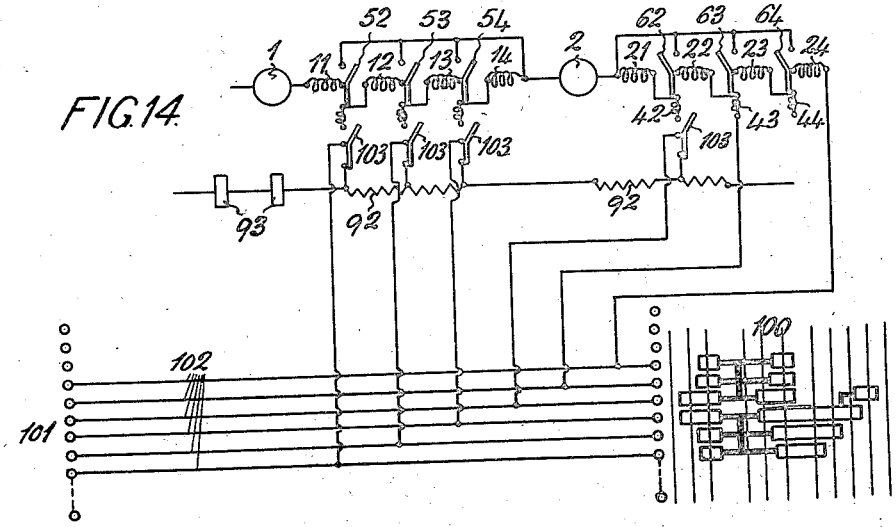

Figure 14 further illustrates means for economizing wiring.

The usual equipment of a tramcar to which the invention may be assumed to be applied needs no illustration. There are two 4-pole series motors, a drum controller at each end of the car, a rheostat and the necessary connecting cables; there may also be magnetic brakes. In the drawings 1 and 2 represent the two armatures 11, 12, 13, 14 and 21, 22, 23, 24, the respective field windings each divided into four sections. Each section has turns enough to produce the full field of the motor if traversed by the full load current, but its cross-sectional area is appropriate for a current of one quarter the full load current. Hence when the sections are in parallel they are equivalent to the usual field winding, but when in series they present sixteen times the resistance of the usual field winding, and correspondingly reduce the current which can flow through the motors.

Changes of connections between the field sections are made by three 2-pole 2-way contactors, each double wound. Thus 32 and 42 are the two windings of one contactor and 52, 62 its two contact-making arms or bridge pieces. It will be convenient to refer to the contactors as a whole as 32, 33, 34 respectively. Contacts such as 70 are contacts made or broken by the drum controller in well known manner.

The scheme of Figures 1 to 8 also employs a contactor 80 in the changing of connections between the two motors.

Figure 1:
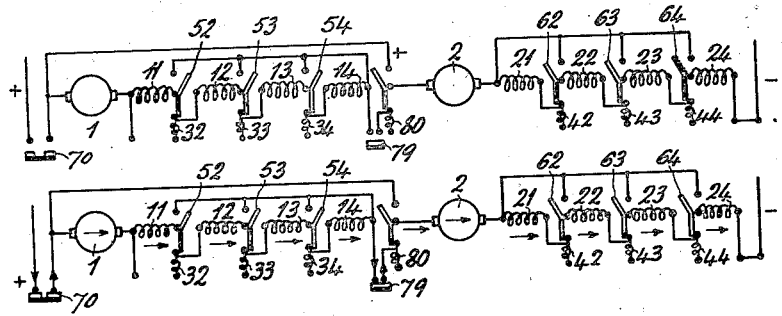
Figures 1 to 7 show the connections made on the several power notches of the drum controller in a system using contactors for controlling both the connections between field sections and the connections between the two motors.
Figure 2:
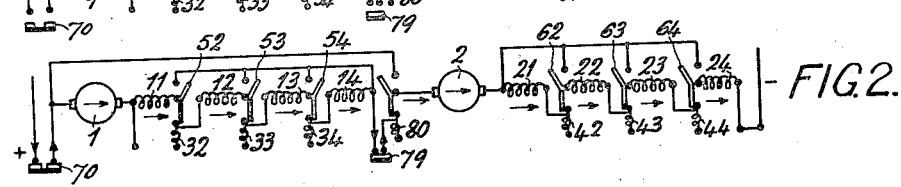

Figure 1 shows the connections when the drum controller is in the "off" position. There is no connection to the external supply and no current is flowing; the contactors are all unexcited, and in that condition the field contactors join the sections of the field winding in series.

On the first power notch the drum controller makes connection to the external supply by the contacts 70, and connects the two motors in series through the unexcited contactor 80 by the contacts 79; the arrows show the flow of current.

Figure 3:
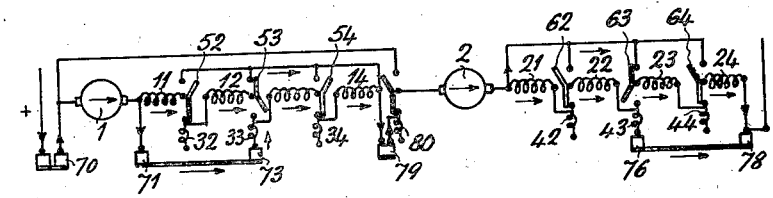

On the second power notch the drum controller joins the contacts 71 and 73 and the contacts 76 and 78. The immediate effect is to place the contactor winding 33 in parallel with the field sections 11 and 12, and the other winding 43 of the same contactor in parallel with the field sections 23 and 24. (Hereinafter it will suffice to mention the one winding only of each contactor, since in all steps the same action takes place in both motor circuits). Contactor 33 is therefore excited and connects sections 11 and 12 of the field winding in parallel with sections 13 and 14 and similarly in the other motor; so that the field sections are now 2-series 2-parallel, as seen in Fig. 3.

Figure 4:
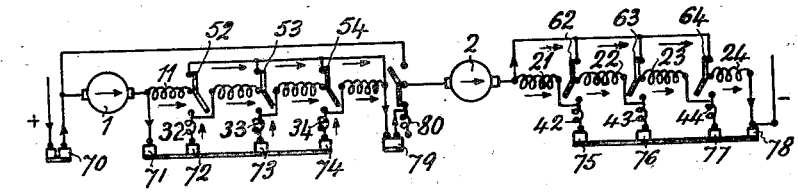
Figure 5:
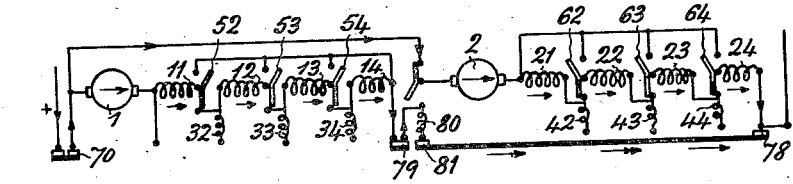

On the third power notch the drum controller connects together all the contacts 71, 72, 73, 74 and all the contacts 75, 76, 77, 78, which has the immediate effect of putting winding 32 in parallel with field section 11, and 34 in parallel with 13. So now all the field contactors are excited, and put all the sections of the field winding in parallel as seen in Figure 4.

In passing from the third to the fourth power notch the drum controller first breaks the connection between contacts 71—74 and 75—78, and then joins contact 81 to contact 78. The contactors 32, 33, 34 therefore fall back while contactor 80 is excited. Thus the field sections 11, 12, 13, 14 are again placed in series, and so are the sections 21, 22, 23, 24, but the latter together with the armature 2 are short-circuited, or, to be strictly correct, are shunted by the winding of contactor 80. The excitation of contactor 80 at once breaks the short-circuit and puts the two motors in parallel, leaving the winding of contactor 80 in the circuit of motor 1.

Figure 6:
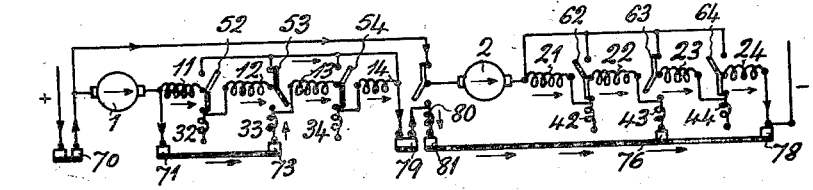

On the fifth power notch of the controller the field sections are connected 2-series 2-parallel, just as on the second notch, the motors remaining in parallel; this is shown in Figure 6.

Figure 7:
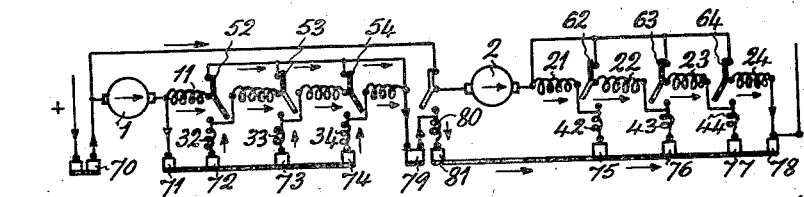

On the sixth power notch the field sections are connected in parallel as on the third; this is shown in Figure 7.

It will be seen that if any contactor fails to respond no harm is done; the connections corresponding to the preceding notch remain until it does respond. No energy is expended in external resistance, and the whole of the field copper is employed on all notches.

For braking the field sections remain connected in series and are shunted by a diverting resistance 90 connected across them by the controller as diagrammatically indicated at 110. The two motors are, as usual, placed in parallel by the drum controller 91, Figure 8, with their fields crossed or not as desired. To prevent unnecessary and undesired operation on the contactor 80 in these circumstances it is provided with a second winding 82 opposing the first, and this is placed by the drum controller in the common circuit of the two parallel motors so that it carries the current of both. Alternatively the winding 80 may be short-circuited or disconnected by the drum controller on brake notches. Braking is governed in well known manner by cutting out sections of the rheostat 92, and the braking circuit may include the magnets 93 of track brakes or other magnetic brakes; all this being usual and forming no part of the invention is not described in detail.

Figure 9:
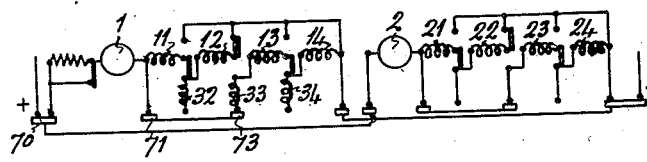
Figures 9 and 10 illustrate alternatives to the connections shown in Figures 5 and 6 respectively, and also show the connections between the motors controlled only by the drum controller.

Other arrangements of the field may be used, if desired, instead of some of those above described or in addition to them, to give the increments of speed found most suitable in any particular case. For example on the placing of the armatures in parallel the connections of the field may be restored to those of the second, instead of to those of the first power notch. This is shown in Figure 9, which illustrates an alternative first parallel notch on which the fields are connected 2-series 2-parallel, as on the second series notch above described. The figure also shows the field contactors with one winding only. The connection of the motors in parallel is shown as effected solely by the drum controller the transition contactor 80 being omitted.

Figure 10:
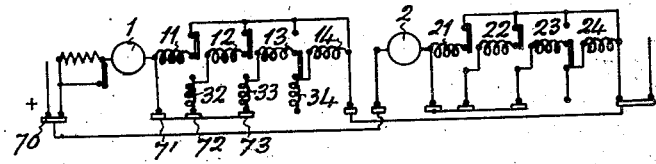

This notch might be followed by a second parallel notch such as shown in Figure 10 where the field of each motor is connected in three parallel branches, one containing two sections of the winding, and the other two each containing one section of the winding. This is shown in Figure 10.

Figure 11:
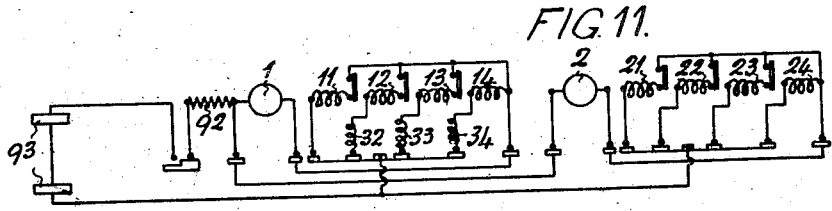
Figures 11 and 12 show an alternative to the connections of Figure 8.
Figure 12:
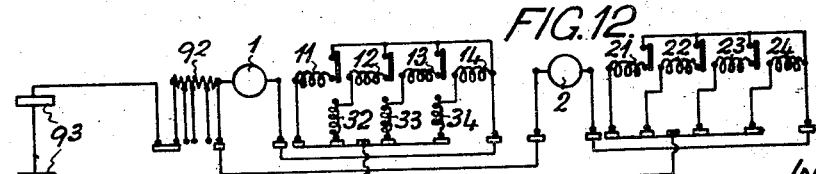

If preferred the field sections may be put in parallel on brake notches as illustrated in Figures 11 and 12. This involves operating all the contactors in the short interval between the first power notch and the first brake notch. To obviate any difficulty arising on hurried application of the brakes the contactors may be operated mechanically as the drum controller passes from the "off" position to the first electric brake notch. For example where pneumatic braking is employed on the vehicle, and in known manner air is admitted to the air brakes before the controller reaches the first electric braking notch, the contactors may be operated (for braking purposes) pneumatically as by a piston and cylinder 107 supplied through a valve 108 actuated by a cam 109 on the controller spindle. In this case the connections shown in Figure 11 are established by the drum controller, and by the pneumatic actuation of the contactors upon the first air brake notch, and the electric braking circuit is completed as shown in Figure 12 upon the next notch. On subsequent brake notches resistance is cut out in well known manner.

Figure 13:
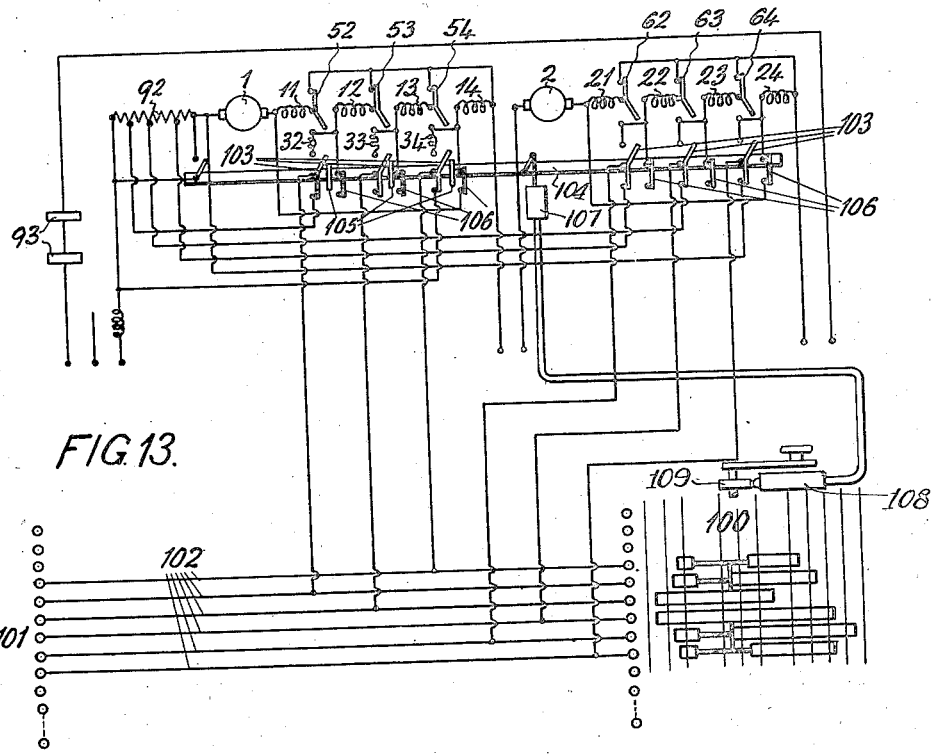
Figure 13 shows a means of obtaining this alternative connection and also means for economizing the wiring needed for the application of the invention.

As initially explained drum controllers at each end of the car, a rheostat, and connecting cables running the length of the car from controller to controller and to the rheostat form part of the usual equipment of a tramcar. When the invention is applied to an existing car the segments of the drum controller by which formerly resistance was inserted and cut out on power notches are no longer required, and the space saved by their removal may be utilized to accommodate the contacts required for completing the field and contactor circuits as above explained. The rheostat and the conductors joining it to the controllers must be retained for rheostatic braking, but some economy of wiring may be achieved by using these conductors for contactor connections on power notches and rheostat connections on brake notches. This is effected by the aid of a change-over switch. Figure 13 shows such a switch combined with a cam shaft for mechanically operating the contactors as just described, on the controller moving to brake notches. The drum controllers are indicated at 100 and 101, only the finger contacts of the latter being shown since it is a duplicate of the other; and for the sake of simplicity only so much of the drum controller is illustrated as is involved in the economy here explained. Also only those conductors 102 running from end to end of the car are shown of which a double use is made. It will be seen that the conductors 102 are connected to rocking switch arms 103 by which they are connected either to the contactors or field sections 32, 33, 34, 22, 23, 24, or to the segments of the braking rheostat 92. The switch arms may conveniently be contacts mounted on a rock shaft 104 which also carries cams 105 to actuate the contactors as above explained. The figure shows the shaft rocked to the position for braking; the contactors are mechanically actuated to connect the field sections in parallel, and the arms 103 connect the conductors 102 to the tappings of the rheostat 92. The rocking switch is shown also completing by contacts 106 the parallel connection of the field sections in lieu of this being done by the drum controller.

Figure 8:
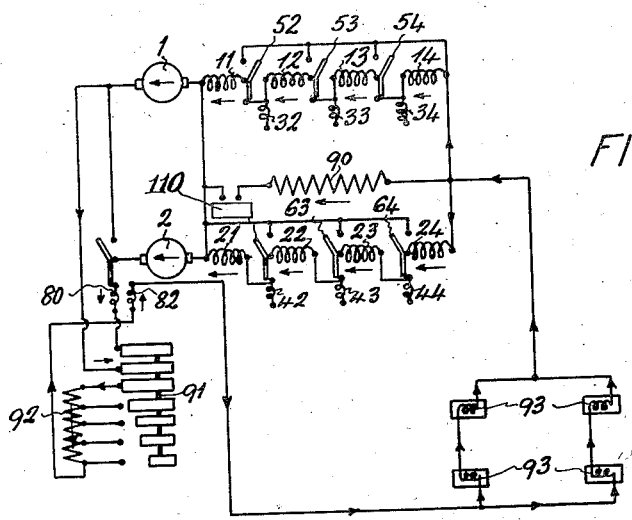
Figure 8 shows the braking circuit for this scheme, the field sections being kept in series and shunted by a diverting resistance.

A similar economy of wiring may be achieved if the field sections remain in use on brake notches as explained with reference to Figure 8. In this case mechanical operation of the contactors is not required and the rock shaft need only carry the switch contacts 103 by which the conductors 102 are connected either, on power notches, with the contactor windings 32—34 and 42—44, or, on brake notches, with the segments of the rheostat 92.

We claim:

1. In an electrically driven vehicle the combination of two motors having armature windings and sub-divided field windings, means for connecting said armature windings in series and in parallel, and means for connecting the sections of the field windings in series, series-parallel and parallel both when the armatures are in series and when they are in parallel.

2. In an electrically driven vehicle the combination of two motors having armature winding and field windings divided into a plurality of sections each section having enough turns to saturate the field if traversed by the full armature current, means for connecting said armature windings in series and in parallel, and means for connecting the sections of the field windings in series, series-parallel and parallel both when the armatures are in series and when they are in parallel.

3. In an electrically driven vehicle the combination with an armature of a field winding divided into sections, contactors having their windings in series with the respective sections for connecting said sections in series and parallel, and means for exciting said contactors in proper sequence and permutations, to connect said sections in series, in series-parallel, and in parallel in succession.

4. In an electrically driven vehicle the combination with two armatures of two field windings divided into sections, double wound contactors having windings in series with the corresponding sections of said two field windings, each winding sufficing to operate the contactor, and means for exciting said contactors in proper sequence and permutations, to connect said sections in series, in series-parallel, and in parallel in succession.

5. In an electrically driven vehicle the combination of two motors having armature windings and divided field windings, means for connecting said armature windings in series and parallel, contactors for connecting the sections of each field winding in series, series-parallel, and parallel, a rheostat, a drum controller governing the circuits of said contactors on power notches and the connections of motors to said rheostat on brake notches, and mechanical means for operating said contactors to put said sections of the field windings in parallel as the controller passes from the first power notch to the first brake notch.

6. In an electrically driven vehicle the combination with two motors having each an armature winding and a field winding divided into sections, of a controller, means for connecting said armatures in series and said field sections in series, on the first power notch of said controller, a rheostat, means for connecting said motors in parallel with the field sections in series to said rheostat upon the first brake notch, and for connecting a resistance in shunt across each field.

7. In an electrically driven vehicle the combination with two motors with armature windings and divided field windings, two controllers at opposite ends of said vehicle, conductors connecting said controllers and a rheostat, of contactors having windings in series with the respective sections of said field winding for connecting said sections in series and parallel, and means for connecting said conductors on the one hand to said contactors and field windings and on the other hand to said rheostat.

8. In an electrically driven vehicle the combination with an electric motor having a field winding divided into at least four sections, each section having enough turns to saturate the field if traversed by the full armature current, of control means for connecting all of said sections in circuit in series, in series parallel and in parallel successively.

9. In an electrically driven vehicle the combination of two motors having armature windings and sub-divided field windings, means for connecting said armature windings in series and in parallel, contactors serving to connect the sections of said field windings in series and parallel respectively, and means for connecting the windings of said contactors in series into the circuit of respective field sections to excite them.

10. In an electrically driven vehicle the combination of two motors having armature windings and sub-divided field windings, means for connecting said armature windings in series, contactors serving to connect in series and in parallel the sections of each field windings, each contactor having two windings either alone sufficing to operate the contactor, and means for connecting the two windings of any contactor in series with corresponding sections of the field windings of the two motors to excite it.

11. In an electrically driven vehicle the combination with a series motor having a field winding divided into sections connected in parallel to carry the maximum motor current, of a contactor controlling the connections of said motor, and means for placing the winding of said contactor in series with a field section to excite it.

ALFRED WALTER MALEY.
EDMUND MACKENZIE TAUNTON.